US012728575B2

(12) United States Patent
Suzuki et al.

(10) Patent No.: US 12,728,575 B2
(45) Date of Patent: Sep. 8, 2026

(54) IN-MOLD COAT INJECTION DEVICE

(71) Applicant: SEIKOH GIKEN Co., Ltd., Matsudo (JP)

(72) Inventors: Masami Suzuki, Matsudo (JP); Norihiro Kakinuma, Matsudo (JP); Arihito Iida, Matsudo (JP)

(73) Assignee: SEIKOH GIKEN Co., Ltd., Matsudo (JP)

( * ) Notice: Subject to any disclaimer, the term of this patent is extended or adjusted under 35 U.S.C. 154(b) by 155 days.

(21) Appl. No.: 18/854,545

(22) PCT Filed: Mar. 26, 2024

(86) PCT No.: PCT/JP2024/011950

§ 371 (c)(1),
(2) Date: Oct. 7, 2024

(87) PCT Pub. No.: WO2024/214532

PCT Pub. Date: Oct. 17, 2024

(65) Prior Publication Data

US 2026/0175488 A1 Jun. 25, 2026

(30) Foreign Application Priority Data

Apr. 10, 2023 (JP) ................................ 2023-063504

(51) Int. Cl.
*B29C 45/16* (2006.01)
*B29C 37/00* (2006.01)
*B29C 45/74* (2006.01)

(52) U.S. Cl.
CPC ...... *B29C 45/1679* (2013.01); *B29C 37/0028* (2013.01); *B29C 45/74* (2013.01)

(58) Field of Classification Search
CPC .. B29C 45/74; B29C 45/1679; B29C 37/0028
See application file for complete search history.

(56) References Cited

U.S. PATENT DOCUMENTS 6,180,043 B1 * 1/2001 Yonemochi ............... B29B 7/76
264/328.8

FOREIGN PATENT DOCUMENTS

| | | | |
|---|---|---|---|
| JP | H08-276460 | A | 10/1996 |
| JP | H09-76285 | A | 3/1997 |
| JP | 3422843 | B | 6/2003 |

OTHER PUBLICATIONS

International Search Report for PCT/JP2024/011950 dated May 14, 2024.
PCT written opinion dated May 14, 2024.

* cited by examiner

*Primary Examiner* — Galen H Hauth
*Assistant Examiner* — Baileigh Kate Darnell
(74) *Attorney, Agent, or Firm* — Yokoi & Co., U.S.A.; Toshiyuki Yokoi

(57) ABSTRACT

Provided with a compact in-mold coat injection device where the accuracy of the amount of injecting liquid coating agent (e.g., coating composition) is high and manufacturing yield of the coating composition is good. An in-mold coat injection device 1 configured to hold a molding base material 2 on one mold 3, press the other mold 4 against the one mold 3 to cover the molding base material 2 and inject a predetermined amount of coating composition 6 into a coating gap 5 formed between an inner surface of the other mold 4 and a surface of the molding base material 2. A measuring cylinder 9 of the coating composition 6 is used as an extrusion cylinder. Thus, a piping connecting the measuring cylinder 9 and the extrusion cylinder can be omitted. When introducing the coating composition 6 into the measuring cylinder 9, an injection port 8 is closed by a gate valve 14. Thus, the accuracy of the measurement is increased. A circulating passage and a circulation pump of the coating composition 6 are not used. Thus, the device is made (Continued)

compact and the manufacturing yield of the coating composition 6 is increased.

6 Claims, 6 Drawing Sheets

37
35
48
38a
38
15
39
38b
34
33
32
14e
36
14c
31
14
36
1
14a
10b
30
10
49
10a
24
25
43
44
7
11
7c
9
12
18
6
13
25
53
52
52
14b
23
54
17
7b
5
21b
4
2
21
26
22a
7a
16
21a
27
20
2a
22
8
3
14d
19

IN-MOLD COAT INJECTION DEVICE

TECHNICAL FIELD

The present invention relates to an in-mold coat injection device configured to hold a molding base material on one mold, press the other mold against the one mold to cover the molding base material and inject a predetermined amount of liquid coating agent into a coating gap formed between an inner surface of the other mold and a surface of the molding base material.

BACKGROUND OF THE INVENTION

In recent years, with increasing awareness of environmental issues, an in-mold coating method (in-mold coating: IMC) has gained attention as an alternative coating technology without using organic solvent and having a high carbon dioxide emission reduction effect. The IMC is the technology of pressing the other mold against one mold holding the molding base material to cover the molding base material by the other mold, injecting a liquid coating agent (e.g., thermosetting coating composition) into a coating gap formed between the inner surface of the other mold and the surface of the molding base material, and forming a coated layer on the outer surface of the molding base material by heating.

The following characteristics can be listed as characteristics of the IMC, for example. (1) The IMC is friendly to the environment and the human body since organic solvent used in general spray coating is not used. (2) The equipment for the coating process (spray application, oven heat treatment) is not required. (3) The waste can be extremely reduced since the coating composition is not diluted with organic solvent and the rate (coating efficiency) of the material (coating composition) formed on the outer surface of the molding base material is extremely high. The IMC is used for improving the quality of the surface of the molded article and simplifying the coating process. In particular, the IMC is widely used for the exterior components or the like in the automobile industry where the outer appearance and quality are highly demanded.

In the IMC, the other mold is pressed against the one mold holding the molding base material to cover the molding base material by the other mold and the liquid coating agent is injected into the coating gap formed between the inner surface of the other mold and the surface of the molding base material. Thus, it is important to inject the liquid coating agent having an appropriate volume corresponding to the volume of the coating gap.

If the volume of the liquid coating agent injected into the coating gap is smaller than the volume of the coating gap, a part of the surface of the molding base material is not coated (so-called short). On the contrary, if the volume of the liquid coating agent injected into the coating gap is larger than the volume of the coating gap, an extra liquid coating agent leaks out from the parting surface between the molds (so-called overflow).

Therefore, an in-mold coat injection device for injecting a predetermined amount of liquid coating agent (e.g., thermosetting coating composition, hereafter also referred to merely as a coating composition) into the coating gap has been conventionally developed (shown in Patent Document 1). FIG. 6 and FIG. 7 of Patent Document 1 disclose an in-mold coat injection device where a measuring cylinder is provided in the middle of the circulating passage in which the coating composition is circulated by a circulation pump and an injection device for injecting the predetermined amount of the coating composition measured by the measuring cylinder into the coating gap located at the downstream side than the measuring cylinder in the circulating passage.

However, in the above described structure where the measuring cylinder and the injection device are separated from each other and connected by the piping, when the coating composition inside the measuring cylinder is extruded to inject the coating composition from the injection device to the coating gap, pressure loss occurs in the piping connecting the measuring cylinder and the injection device. Thus, the piping is slightly expanded and precision cannot be expected for the measurement of the coating composition to be injected. In particular, when the thickness of the coating composition coated on the surface of the molding base material is 0.1 mm or less or when the amount of the coating composition injected into the coating gap per one time is small (e.g., a few cc), it is difficult to inject an appropriate amount of the coating composition corresponding to the volume of the coating gap. Thus, the above described short or overflow may occur depending on the usage conditions.

In order to solve the above described problems, FIG. 1 and FIG. 2 of Patent Document 1 disclose an in-mold coat injection device where a measurement and injection portion having both functions of the measuring cylinder and the injection device is provided in the middle of the circulating passage in which the coating composition is circulated by the circulation pump and a predetermined amount of the coating composition is injected into the coating gap by the measurement and injection portion. In the above described configuration, since the coating composition is measured and injected by the measurement and injection portion, the pressure loss and the expansion of the piping connecting the measuring cylinder and the injection device do not occur different from the above described configuration.

PRIOR ART DOCUMENT

Patent Document

[Patent Document 1] Japanese Patent No. 3422843

SUMMARY OF THE INVENTION

Problem to be Solved by the Invention

However, in the in-mold coat injection device described in FIG. 1 and FIG. 2 of Patent Document 1, the coating composition is prevented from receiving the heat from the mold by circulating the coating composition in the circulating passage. Thus, the circulating passage and the circulation pump are required and the system becomes large and complicated.

In addition, in order to avoid hardening of the coating composition inside the circulating passage after the daily operations, it is necessary to discharge all of the coating composition remained in the circulating passage. Here, it is necessary to provide a circulation pump and a tank of the coating composition in the middle of the circulating passage. Thus, the coating composition entered in the device is limited to a certain amount. Therefore, when comparing the amount of the coating composition inside the circulating passage to be discharged at the closing time of the daily operations and the coating composition required for coating the molding base material in the daily operations, a manufacturing yield of the material (coating composition) cannot be considered good. In particular, when the size of the molding base material is small and the coating thickness of the coating composition coated on the surface is 0.1 mm or less, the amount of the coating composition required for the coating is small while the amount of the coating composition remained inside the circulating passage is relatively large. Thus, the manufacturing yield is extremely poor.

In addition, when one-component curable thermosetting coating composition is used as the coating composition, the pot life (time of starting the hardening at normal temperature) of approximately 12 hours should be considered after a curing initiator is mixed with the coating composition at the start of the daily operations. Thus, the coating composition in the circulating passage should be necessarily discharged at the closing time of the daily operations. The operation of discharging the coating composition is necessary and all of the coating composition remained inside the circulating passage is wasted.

In addition, in the in-mold coat injection device disclosed in FIG. 1 and FIG. 2 of Patent Document 1, a measurement/injection space (hereafter referred to as a cylinder) of the measurement and injection portion is formed in an elongated shape and a piston moved upward and downward inside the cylinder is formed in an elongated rod shape. When the piston is moved upward and the coating composition is introduced in the cylinder from an upper part of the cylinder, an injection port located at a lower part of the cylinder is closed by the surface of the molding base material. Thus, a predetermined amount of the coating composition is stored in the cylinder. As described above, a gate valve for opening and closing the injection port located at the lower part of the cylinder is not provided and a predetermined amount of the coating composition is stored in the cylinder by closing the injection port by the surface of the molding base material in the mold. Thus, there is a possibility of the leakage of the coating composition inside the cylinder from the injection port to the mold. In that case, there is a problem in accuracy of the measurement.

In addition, the coating composition is stored in the cylinder by closing the injection port located at the lower part of the cylinder by the surface of the molding base material in the mold and the surface of the molding base material in the mold is used as a gate valve of the injection port located at the lower part of the cylinder as describe above. Thus, it is necessary to embed the cylinder in a thick part of the cylinder so that the injection port located at the lower part of the cylinder is connected with the inner surface of a cavity of the mold. As a result, the coating composition inside the cylinder receives the heat from the mold and the curing reaction proceeds. Thus, there is a possibility that the coating composition cannot be properly injected to the corners when the piston is descended to inject the coating composition inside the cylinder from the injection port to the mold.

The purpose of the present invention invented by considering the above described situations is to provide a compact in-mold coat injection device where the accuracy of the amount of injecting the liquid coating agent is high and the manufacturing yield of the coating composition is good.

Means for Solving the Problem

The present invention invented for achieving the above described purposes provides an in-mold coat injection device configured to hold a molding base material on one mold, press the other mold against the one mold to cover the molding base material and inject a predetermined amount of liquid coating agent into a coating gap formed between an inner surface of the other mold and a surface of the molding base material, the in-mold coat injection device including: an injection device body attached to the other mold; an injection port provided on an end portion of the injection device body for injecting the liquid coating agent into the coating gap; a measuring cylinder provided inside the injection device body and connected to the injection port; a piston configured to be moved inside the measuring cylinder in an axial direction of the measuring cylinder; a supply port provided at a side portion of the injection device body and connected to the measuring cylinder; a supply valve provided on a supply passage of the liquid coating agent and connected to the supply port to close the supply passage when the piston moves to a discharge direction for reducing a volume of the measuring cylinder and open the supply passage when the piston moves to a suction direction for increasing the volume of the measuring cylinder; a gate valve slidably attached to the piston in an axial direction of the piston so that the gate valve is slid and moved between a valve opening position for opening the injection port and a valve closing position for closing the injection port; and an actuator configured to fill a predetermined amount of the liquid coating agent into the measuring cylinder by moving the gate valve to the valve closing position and moving the piston to the suction direction for introducing the liquid coating agent from the supply port to the measuring cylinder, and then discharge the predetermined amount of the liquid coating agent from the injection port by moving the gate valve to the valve opening position and moving the piston to the discharge direction (claim 1).

In the in-mold coat injection device of the present invention, the supply valve can be a check valve for allowing the liquid coating agent to flow from the supply passage to the measuring cylinder and preventing the liquid coating agent from flowing from the measuring cylinder to the supply passage (claim 2).

In the in-mold coat injection device of the present invention, the actuator can include: a piston actuating flange formed on a portion of the piston protruded from the measuring cylinder for moving the piston in the axial direction of the measuring cylinder; a piston actuating cylinder formed to house the piston actuating flange in the piston actuating cylinder so that the piston actuating flange can be freely moved along the axial direction of the measuring cylinder; a gate valve actuating flange formed on a portion of the gate valve protruded from the piston for moving the gate valve in the axial direction of the piston; a gate valve actuating cylinder connected to the piston actuating cylinder for housing the gate valve actuating flange in the gate valve actuating cylinder so that the gate valve actuating flange is freely movable along the axial direction of the piston; and a fluid pressure switching unit for switching between a measurement mode where a fluid pressure is applied on an upper surface of the gate valve actuating flange and a lower surface of the piston actuating flange to close the injection port by the gate valve and move the piston to the suction direction and an injection mode where the fluid pressure is applied on a lower surface of the gate valve actuating flange and an upper surface of the piston actuating flange to open the injection port by the gate valve and move the piston to the discharge direction (claim 3).

In the in-mold coat injection device of the present invention, the liquid coating agent can be a one-component thermosetting coating composition, and a coolant passage can be formed inside the injection device body for surrounding a passage of the liquid coating agent discharged from the measuring cylinder to the injection port (claim 4).

Effect of the Invention

The in-mold coat injection device of the present invention has the following effects.

(1) The measuring cylinder of the liquid coating agent is used also as an extrusion cylinder of the liquid coating agent. Thus, a piping connecting the measuring cylinder and the extrusion cylinder can be omitted. The injection port is closed by the gate valve when introducing the liquid coating agent to the measuring cylinder. Thus, the accuracy of discharging the liquid coating agent can be increased.

(2) The liquid coating agent introduced from the supply port into the measuring cylinder via the supply passage is extruded from the injection port by the piston. The circulating passage and the circulation pump of the liquid coating agent described in the prior art are not used. It is not necessary to discharge and dispose the coating composition remained in the circulating passage and the circulation pump after the daily operations. Thus, the manufacturing yield of the liquid coating agent is increased.

(3) The circulating passage and the circulation pump of the liquid coating agent are not used. Thus, the entire the device can be made compact and the manufacturing yield of the liquid coating agent is increased.

BRIEF DESCRIPTION OF DRAWINGS

FIG. 6A is a transparent perspective view and FIG. 6B is a cross-sectional view.

MODES FOR CARRYING OUT THE INVENTION

Figure 1:
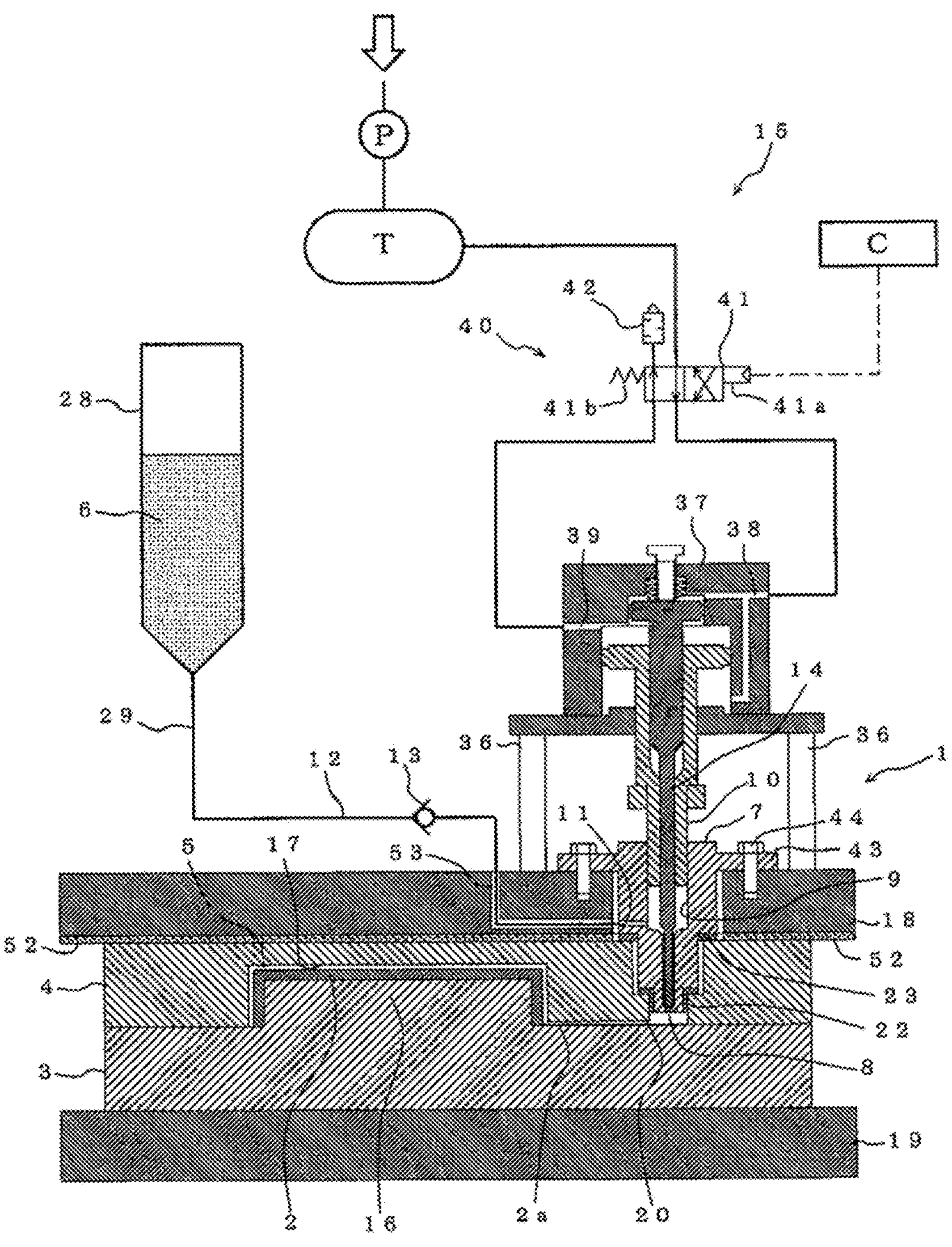
FIG. 1 is a cross-sectional view showing an entire system of an in-mold coat injection device concerning an embodiment of the present invention.

Hereafter, the preferable embodiments of the present invention will be explained in detail with reference to the attached drawings. The dimensions, materials, other specific values and the like shown in the embodiments are merely examples for facilitating the understanding of the invention. These do not limit the present invention unless particularly mentioned. Note that the repeated explanation of the elements having substantially same functions and configurations is omitted in the specification and drawings by adding the same reference numeral. In addition, the illustration of the elements not directly related to the present invention is omitted.

(Overview of in-Mold Coat Injection Device 1)

In an in-mold coat injection device 1 of the present invention, as shown in FIG. 1, a molding base material 2 is held on one mold 3, the other mold 4 is pressed against the one mold 3 to cover the molding base material 2, a predetermined amount of liquid coating agent 6 is injected into a coating gap 5 formed between an inner surface of the other mold 4 and a surface of the molding base material 2.

Figure 2:
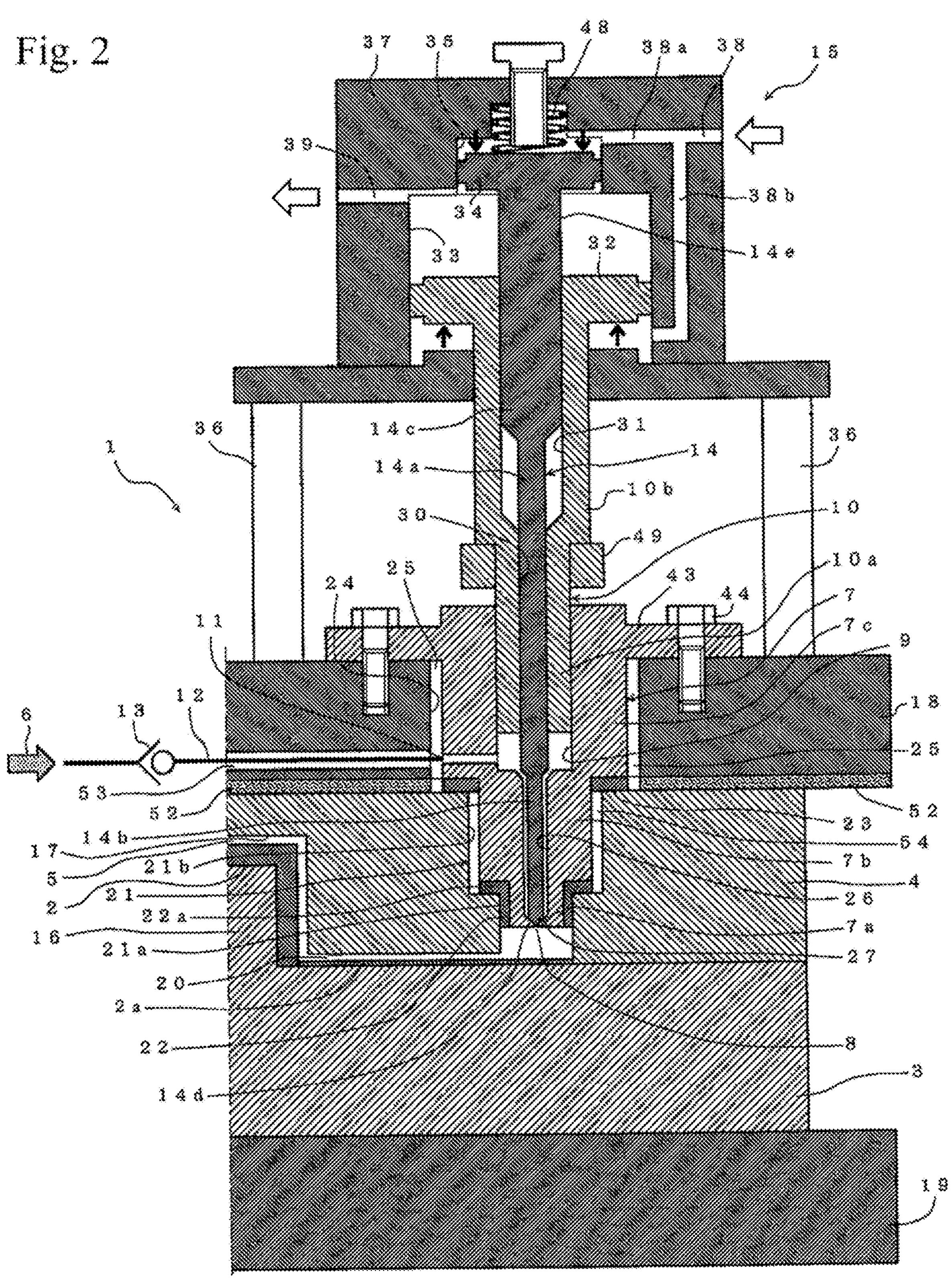
FIG. 2 is a cross-sectional view when measurement is started in the in-mold coat injection device of FIG. 1.

As shown in FIG. 2, which is an enlarged view of an essential part of FIG. 1, the in-mold coat injection device 1 concerning one embodiment of the present invention includes: an injection device body 7 attached to the other mold 4; an injection port 8 provided on an end portion of the injection device body 7 for injecting the liquid coating agent 6 into a coating gap 5; a measuring cylinder 9 provided inside the injection device body 7 and connected to the injection port 8; a piston 10 configured to be moved inside the measuring cylinder 9 in an axial direction of the measuring cylinder 9; a supply port 11 provided at a side portion of the injection device body 7 and connected to the measuring cylinder 9; and a supply valve 13 provided on a supply passage 12 of the liquid coating agent 6 connected to the supply port 11 to close the supply passage 12 when the piston 10 moves to a discharge direction for reducing a volume of the measuring cylinder 9 and open the supply passage 12 when the piston 10 moves to a suction direction for increasing the volume of the measuring cylinder 9.

Figure 3:
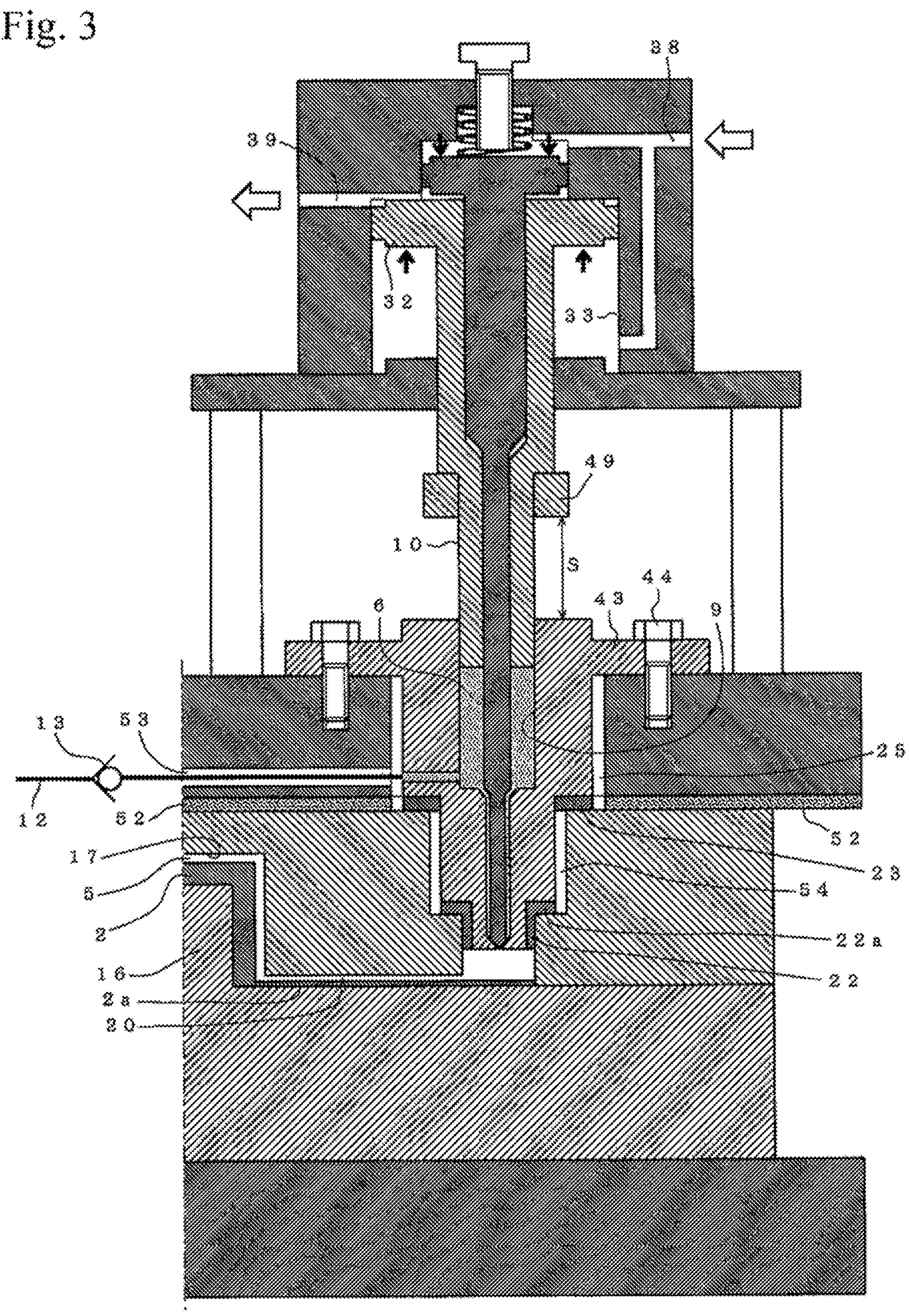
FIG. 3 is a cross-sectional view when the measurement is finished following FIG. 2.
Figure 4:
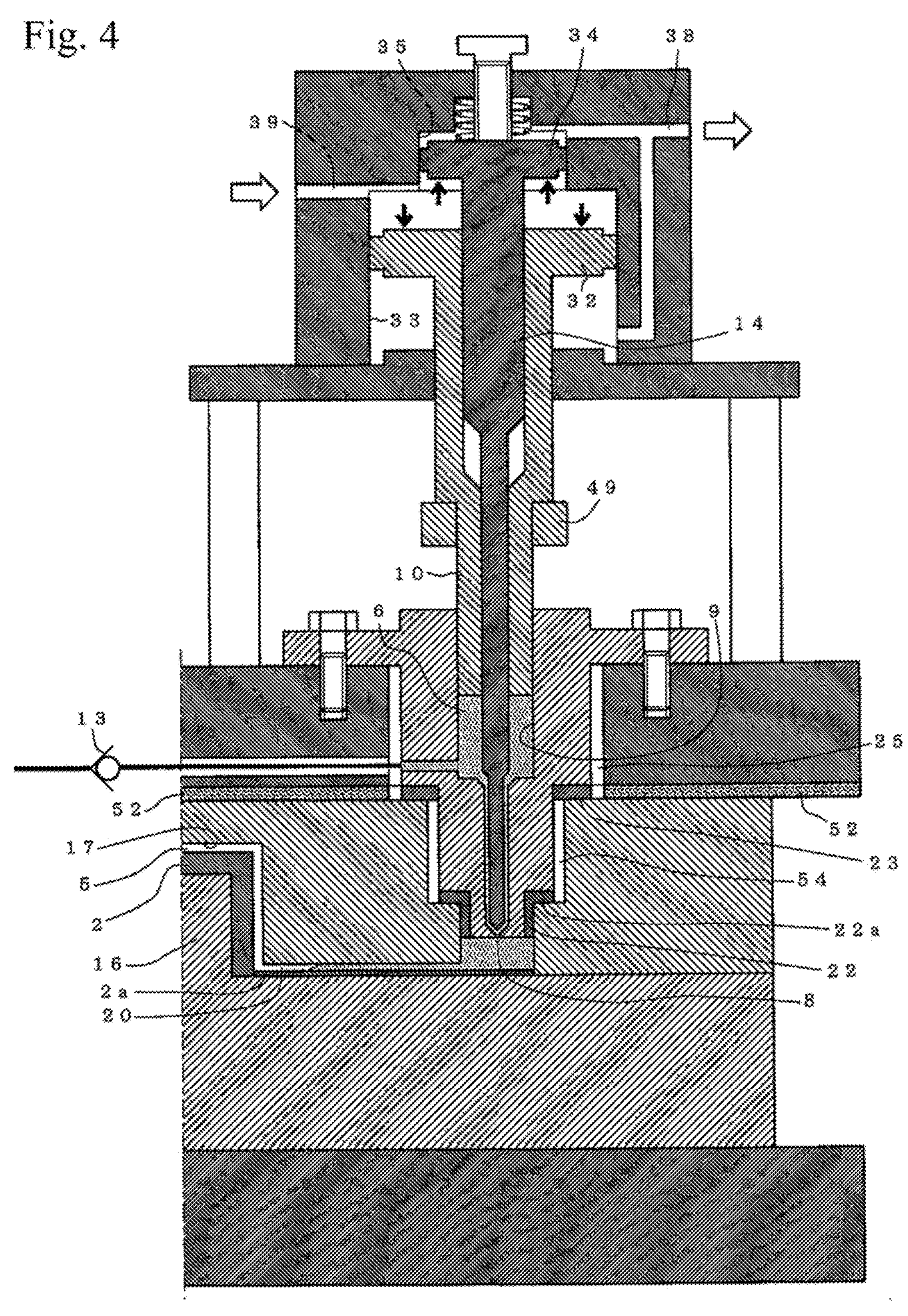
FIG. 4 is a cross-sectional view when injection is started following FIG. 3.
Figure 5:
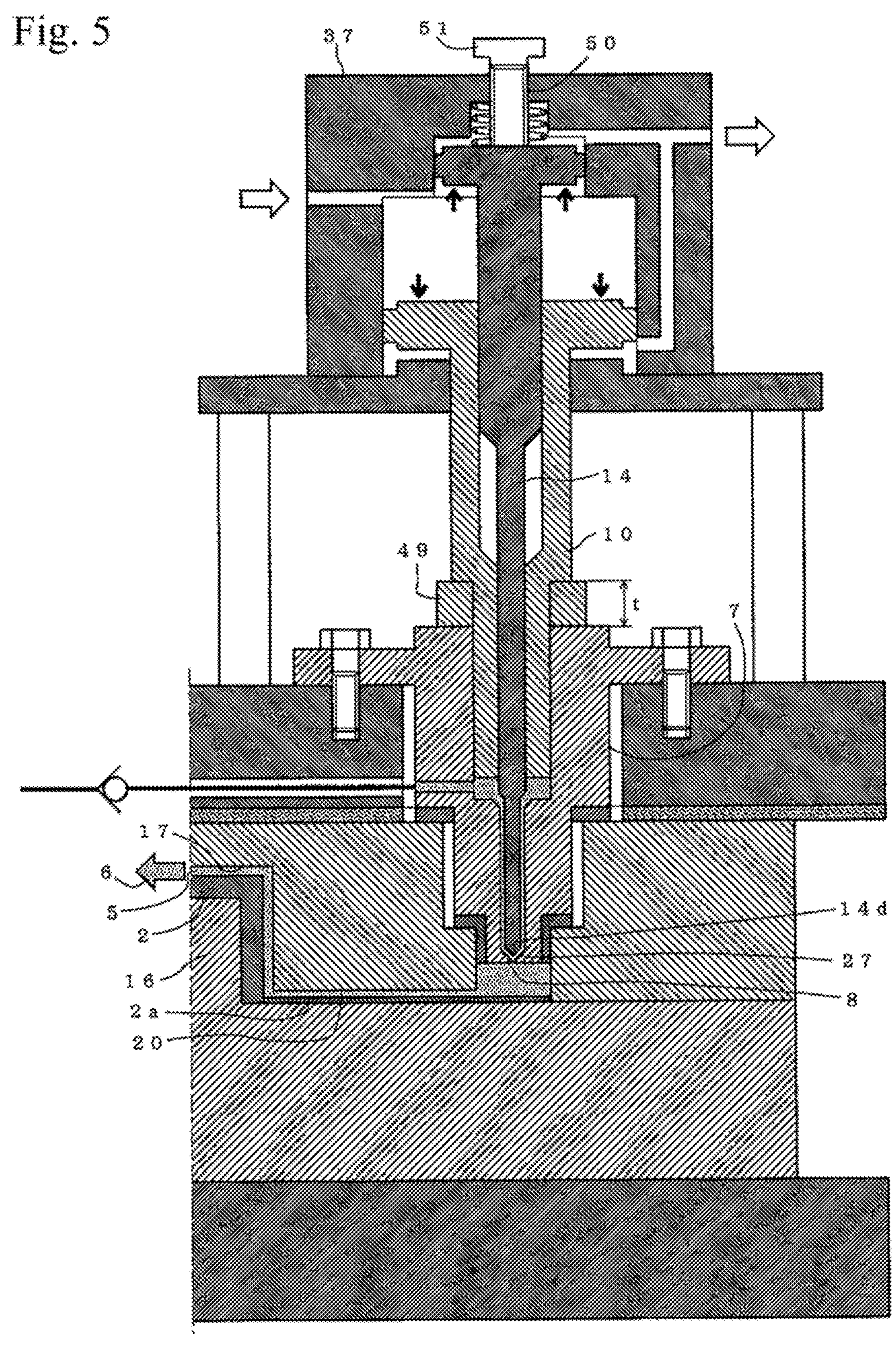
FIG. 5 is a cross-sectional view when the injection is finished following FIG. 4.

In addition, as shown in FIG. 2, the in-mold coat injection device 1 concerning the present embodiment includes: a gate valve 14 attached to the piston 10 so as to be slidable in an axial direction of the piston 10 so that the gate valve 14 is slid and moved between a valve opening position for opening the injection port 8 and a valve closing position for closing the injection port 8; and an actuator 15 configured to fill a predetermined amount of the liquid coating agent 6 into the measuring cylinder 9 by moving the gate valve 14 to the valve closing position and moving the piston 10 to the suction direction for introducing the liquid coating agent 6 from the supply port 11 to the measuring cylinder 9 as shown in FIG. 2 to FIG. 3, and then discharge the predetermined amount of the liquid coating agent 6 from the injection port 8 by moving the gate valve 14 to the valve opening position and moving the piston 10 to the discharge direction as shown in FIG. 4 to FIG. 5. Hereafter, each component will be explained.

(Molds, Coating Gap 5)

As shown in FIG. 1, the molds are composed of: one mold 3 (hereafter also referred to as a lower mold 3) on which a convex core 16 is formed to install a separately formed molding base material 2 on the core 16; and the other mold 4 (hereafter also referred to as an upper mold 4) arranged to face the one mold 3 and a cavity 17 is recessed on the other mold 4 so that a predetermined coating gap 5 (e.g., 50 μm to 100 μm) is formed between the other mold 4 and an outer surface of the molding base material 2 installed on the core 16 of the lower mold 3. The upper mold 4 is attached to a lower surface of an upper platen 18 via an insulation plate 52 with not-illustrated bolts. The lower mold 3 is attached to an upper surface of a lower platen 19 with not-illustrated bolts. The lower platen 19 is configured to move in the vertical direction with respect to the upper platen 18. Thus, the lower mold 3 is approached to or separated from the upper mold 4 for clamping or opening the mold.

As shown in FIG. 1, a runner groove 20 is formed on an abutting surface (parting surface) between the upper mold 4 and the lower mold 3 for supplying the liquid coating agent 6 (e.g., one-component thermosetting coating composition, hereafter also referred to merely as a coating composition) in the coating gap 5 formed between the outer surface of the molding base material 2 and the inner surface of the cavity 17 of the upper mold 4 when clamping the mold. A runner 2*a*, which is formed when forming the molding base material 2 by another not-illustrated molding mold instead of the upper mold 4, is housed in the runner groove 20. As shown in FIG. 4 and FIG. 5, the coating composition 6 is injected into the coating gap 5 along the runner 2*a* via the runner groove 20. A not-illustrated heating mechanism (e.g., electric resistance wire) is provided on the upper mold 4 for heating and hardening the coating composition 6 injected into the coating gap 5 via the runner groove 20. The insulation plate 52 provided between the upper mold 4 and the upper platen 18 functions to suppress the transfer of the heat from the upper mold 4 to the upper platen 18. Consequently, the heat inputted from the upper platen 18 to the injection device body 7 is reduced and the progress of the curing reaction of the coating composition 6 (one-component thermosetting coating composition) introduced to an inside (cylinder 9) of the injection device body 7 is suppressed.

(Injection Device Body 7)

In the present embodiment, as shown in FIG. 2, the injection device body 7 is a three-stage cylindrical body formed by connecting a small-diameter portion 7*a*, a middle-diameter portion 7*b* and a large-diameter portion 7*c* from below to above. A mounting flange 43 is provided on the outer peripheral surface of the large-diameter portion 7*c*. The mounting flange 43 is attached to the upper platen 18 by bolts 44. A fitting hole 21 is formed on the upper mold 4 for housing the injection device body 7 so that the fitting hole 21 penetrates through upper and lower surfaces to be connected to the runner groove 20. The fitting hole 21 is composed of a small-diameter hole portion 21*a* having the hole diameter corresponding to the small-diameter portion 7*a* of the injection device body 7 and a middle-diameter hole portion 21*b* having the hole diameter larger than the middle-diameter portion 7*b* of the injection device body 7. A predetermined interval 54 is formed between the middle-diameter hole portion 21*b* and the middle-diameter portion 7*b*. The interval 54 functions as an air heat insulating layer for suppressing the transfer of the heat from the upper mold 4 to the injection device body 7.

As shown in FIG. 2, a through hole 24 having the hole diameter larger than the large-diameter portion 7*c* is formed on the upper platen 18 for housing the large-diameter portion 7*c* of the injection device body 7 in the through hole 24. A clearance 25 is formed between the through hole 24 and the large-diameter portion 7*c* of the injection device body 7. The clearance 25 functions as the air heat insulating layer for suppressing the transfer of the heat transmitted from the upper mold 4 to the upper platen 18 via the insulation plate 52 to the injection device body 7 although the heat is small.

As shown in FIG. 2, an insulation sleeve 22 is interposed between the small-diameter portion 7*a* of the injection device body 7 and the small diameter hole portion 21*a* of the fitting hole 21. The insulation sleeve 22 suppresses the transfer of the heat from the upper mold 4 to the injection device body 7 to suppress the progress of the curing reaction of the coating composition 6 (one-component thermosetting coating composition) introduced inside the injection device body 7. An insulation flange 22*a* is integrally formed on the upper end of the insulation sleeve 22. The insulation flange 22*a* is sandwiched between a step formed from the small-diameter portion 7*a* to the middle-diameter portion 7*b* of the injection device body 7 and a step formed from the small-diameter hole portion 21*a* to the middle-diameter hole portion 21*b* of the fitting hole 21. Thus, the transfer of the heat from the upper mold 4 to the injection device body 7 is suppressed and the progress of the curing reaction of the coating composition 6 (one-component thermosetting coating composition) introduced into the injection device body 7 by the heat of the upper mold 4 is suppressed. In addition, the insulation flange 22*a* is sandwiched between the steps and slightly crushed when screwing the bolts 44. Thus, the insulation flange 22*a* functions as a packing for preventing the coating composition 6 inside the runner groove 20 from leaking above from a space between the fitting hole 21 and the injection device body 7.

As shown in FIG. 2, a heat insulation ring 23 is interposed between the step formed from the large-diameter portion 7*c* to the middle-diameter portion 7*b* of the injection device body 7 and the upper surface of the upper mold 4 for preventing the heat of the upper mold 4 from transferring to the injection device body 7. The heat insulation ring 23 functions to suppress the transfer of the heat of the upper mold 4 inside the injection device body 7 and suppress the progress of the curing reaction of the coating composition 6 (one-component thermosetting coating composition) introduced inside the injection device body 7 by the heat of the upper mold 4. In addition, the heat insulation ring 23 is sandwiched between the lower surface of the large-diameter portion 7*c* and the upper surface of the upper mold 4 and slightly crushed when screwing the bolts 44. A male screw portion of the bolts 44 and a female screw portion of the screw hole for the bolts 44 formed on the upper platen 18 are pressed against each other in the axial direction by a restoring force of the heat insulation ring 23. Thus, the heat insulation ring 23 also functions as the material of preventing the bolts 44 from loosening. In addition, the insulation flange 22*a* of the insulation sleeve 22 also functions as the material of preventing the bolts 44 from loosening since the insulation flange 22*a* is slightly crushed to exhibit the restoring force when screwing the bolts 44.

(Measuring Cylinder 9, Piston 10)

As shown in FIG. 2, the measuring cylinder 9 is formed inside the injection device body 7 for housing a predetermined amount of the coating composition 6 in the measuring cylinder 9. The measuring cylinder 9 is formed inside the large-diameter portion 7*c* of the injection device body 7. The measuring cylinder 9 is arranged at the position least affected by the heat of the upper mold 4 in the injection device body 7 by the above described insulation sleeve 22, heat insulation ring 23, clearance 25 (air heat insulating layer) and clearance 54 (air heat insulating layer). In the present embodiment, the measuring cylinder 9 is arranged at a higher position than the upper surface of the upper mold 4 and a higher position than the heat insulation ring 23. A piston 10 is provided inside the measuring cylinder 9 so that the piston 10 can be freely moved inside the measuring cylinder 9 in an axial direction (vertical direction) of the measuring cylinder 9. The piston 10 includes a piston body portion 10*a* having the diameter capable of sliding in the measuring cylinder 9, and a piston protrusion portion 10*b* provided on the portion protruded from the measuring cylinder 9 located above the piston body portion 10*a*.

(Injection Port 8, Supply Port 11)

As shown in FIG. 2, a passage hole 26 having a smaller diameter than the measuring cylinder 9 is formed inside the middle-diameter portion 7*b* and the small-diameter portion 7*a* of the injection device body 7 so that the passage hole 26 is connected to the measuring cylinder 9. A valve sheet 27 having a conical shape is formed on the lower end of the passage hole 26. The injection port 8 is formed on the lower end of the valve sheet 27 so as to face the runner groove 20. The injection port 8 is configured to inject the coating composition 6 inside the measuring cylinder 9 into the runner groove 20 via the passage hole 26. The injection port 8 is closed when the lower end of the gate valve 14 is seated on the valve sheet 27 while the injection port 8 is opened when the lower end of the gate valve 14 is separated from the valve sheet 27. In addition, the supply port 11 is provided at the side portion of the large-diameter portion 7*c* of the injection device body 7 and connected to the measuring cylinder 9 for supplying the coating composition 6 to the measuring cylinder 9.

(Supply Passage 12)

As shown in FIG. 2, the supply passage 12 is connected to the supply port 11 located at the side portion of the large-diameter portion 7*c* of the injection device body 7 for supplying the coating composition 6 to the measuring cylinder 9. The supply passage 12 is inserted in the hole formed inside the upper platen 18. The hole has a larger diameter than the outer diameter of the supply passage 12. A clearance 53 is formed between the hole and the supply passage 12. The clearance 53 functions as the air heat insulating layer for preventing the heat of the upper platen 18 from transferring to the coating composition 6 flowing in the supply passage 12.

(Supply Valve 13)

The supply valve 13 is provided on the supply passage 12 shown in FIG. 1. When the piston 10 is moved to the suction direction (upward) to increase the volume of the measuring cylinder 9 as shown in FIG. 2 to FIG. 3, the supply passage 12 is opened. When the piston 10 is moved to the discharge direction (downward) to reduce the volume of the measuring cylinder 9 as shown in FIG. 4 to FIG. 5, the supply passage 12 is closed. In the present embodiment, a check valve is used as the supply valve 13 for allowing the coating composition 6 to flow from the supply passage 12 to the measuring cylinder 9 and preventing the coating composition 6 from flowing from the measuring cylinder 9 to the supply passage 12. However, it is also possible to control the opening/closing of a switching valve to open/close the supply passage 12 as described above. As shown in FIG. 1, a coating composition tank 28 storing the coating composition 6 is connected to an upstream side of the supply valve 13 via a piping 29.

(Gate Valve 14)

As shown in FIG. 2, a hole 30 is penetrated through the piston 10 in the axial direction (vertical direction). The gate valve 14 having an elongated shape in the vertical direction is attached to the hole 30 so as to be slidable in the axial direction. The gate valve 14 includes a middle-diameter portion 14*a* having the diameter capable of sliding in the hole 30, a small-diameter portion 14*b* integrally formed with the lower part of the middle-diameter portion 14*a*, and a large-diameter portion 14*c* integrally formed with the upper part of the middle-diameter portion 14*a*. The small-diameter portion 14*b* is housed in the passage hole 26 while being separated by a predetermined clearance from the passage hole 26 in the diameter direction. A tip valve portion 14*d* having a conical shape is provided on the lower end of the small-diameter portion 14*b* so as to be seated on the valve sheet 27. The large-diameter portion 14*c* has the diameter capable of sliding in a hole 31 formed inside the piston protrusion portion 10*b* in the axial direction. The upper part of the large-diameter portion 14*c* is protruded upward from the piston protrusion portion 10*b*. The above described gate valve 14 is shifted to the valve opening position for opening the injection port 8 when the gate valve 14 is moved upward and the tip valve portion 14*d* is separated from the valve sheet 27. The gate valve 14 is shifted to the valve closing position for closing the injection port 8 when the gate valve 14 moves downward and the tip valve portion 14*d* is seated on the valve sheet 27.

(Actuator 15)

As shown in FIG. 1, the piston 10 and the gate valve 14 are separately moved upward and downward by the actuator 15 appropriately. As shown in FIG. 2 to FIG. 3, the actuator 15 moves the gate valve 14 downward to the valve closing position and moves the piston 10 upward to the suction direction for introducing the liquid coating agent 6 from the supply port 11 to the measuring cylinder 9 so that a predetermined amount of the liquid coating agent 6 is filled in the measuring cylinder 9. After that, as shown in FIG. 4 to FIG. 5, the actuator 15 moves the gate valve 14 upward to the valve opening position and moves the piston 10 downward to the discharge direction so that a predetermined amount of the liquid coating agent 6 is discharged from the injection port 8.

As shown in FIG. 2, the actuator 15 includes: a piston actuating flange 32 formed on a portion of the piston 10 (piston protrusion portion 10*b*) protruded from the measuring cylinder 9 for moving the piston 10 in the axial direction of the measuring cylinder 9; a piston actuating cylinder 33 formed to house the piston actuating flange 32 in the piston actuating cylinder 33 so that the piston actuating flange 32 can be freely moved along the axial direction of the measuring cylinder 9; a gate valve actuating flange 34 formed on a portion (gate valve protrusion 14*e*) of the gate valve 14 protruded from the piston 10 for moving the gate valve 14 in the axial direction of the piston 10; and a gate valve actuating cylinder 35 connected to the piston actuating cylinder 33 for housing the gate valve actuating flange 34 in the gate valve actuating cylinder 35 so that the gate valve actuating flange 34 is freely movable along the axial direction of the piston 10.

As shown in FIG. 2, the piston actuating cylinder 33 and the gate valve actuating cylinder 35 are respectively formed inside a cylinder block 37 which is mounted on the upper platen 18 via a pillar 36. The cylinder block 37A includes a first passage 38 for applying a fluid pressure on the upper surface of the gate valve actuating flange 34 and the lower surface of the piston actuating flange 32 and a second passage 39 for applying a fluid pressure on the lower surface of the gate valve actuating flange 34 and the upper surface of the piston actuating flange 32. The first passage 38 includes a passage 38*a* for connecting a hole formed on one side surface of the cylinder block 37 with an upper portion of the gate valve actuating cylinder 35 located upper than the gate valve actuating flange 34 and a passage 38*b* for connecting an intermediate portion of the passage 38*a* with a lower portion of the piston actuating cylinder 33 located lower than the piston actuating flange 32. The second passage 39 connects a hole formed on the other side surface of the cylinder block 37 with an upper portion of the piston actuating cylinder 33 located upper than the piston actuating flange 32.

In addition, the actuator 15 includes a fluid pressure switching unit 40 (shown in FIG. 1) capable of freely switching between a measurement mode and an injection mode. In the measurement mode, a fluid (e.g., air, water, oil) is supplied to the first passage 38. Thus, the actuator 15 applies a fluid pressure on an upper surface of the gate valve actuating flange 34 and a lower surface of the piston actuating flange 32 to close the injection port 8 by the gate valve 14 and move the piston 10 to the suction direction as shown in FIG. 2 to FIG. 3. In the injection mode, the fluid is supplied to the second passage 39. Thus, the actuator 15 applies a fluid pressure on a lower surface of the gate valve actuating flange 34 and an upper surface of the piston actuating flange 32 to open the injection port 8 by the gate valve 14 and move the piston 10 to the discharge direction as shown in FIG. 4 to FIG. 5.

(Fluid Pressure Switching Unit 40)

As shown in FIG. 1, the fluid pressure switching unit 40 includes a switching valve 41 connected to the first passage 38 and the second passage 39, a tank T (e.g., air tank, water tank, oil tank) housing a liquid (e.g., air, water, oil) for supplying a fluid pressure (e.g., air pressure, water pressure, oil pressure) at a predetermined pressure, a pump P for pressurizing the fluid and supplying the fluid to the tank T, and a controller C for switching the switching valve 41 appropriately. The present embodiment shows the example where the air is used as the fluid and an electromagnetic solenoid valve is used as the switching valve 41.

In the electromagnetic solenoid valve (switching valve 41) shown in FIG. 1, when the electricity is not supplied from the controller C to a solenoid 41*a* of the switching valve 41, a box is pushed rightward by a spring 41*b* and a parallel circuit is activated. As a result, the air in the tank T is supplied to the first passage 38 and the air in the second passage 39 is exhausted from an exhaust silencer 42. Consequently, as shown in FIG. 2 to FIG. 3, the gate valve 14 moves downward to the valve closing position while the piston moves upward to the suction direction.

On the other hand, when the electricity is supplied from the controller C shown in FIG. 1 to the solenoid 41*a*, the solenoid 41*a* is excited and the box is moved leftward and a cross circuit is activated. As a result, the air in the tank T is supplied to the second passage 39 and the air in the first passage 38 is exhausted from the exhaust silencer 42. Consequently, as shown in FIG. 4 to FIG. 5, the gate valve 14 moves upward to the valve opening position while the piston moves downward to the discharge direction.

(Coolant Passage)

Figures 6A, 6B:
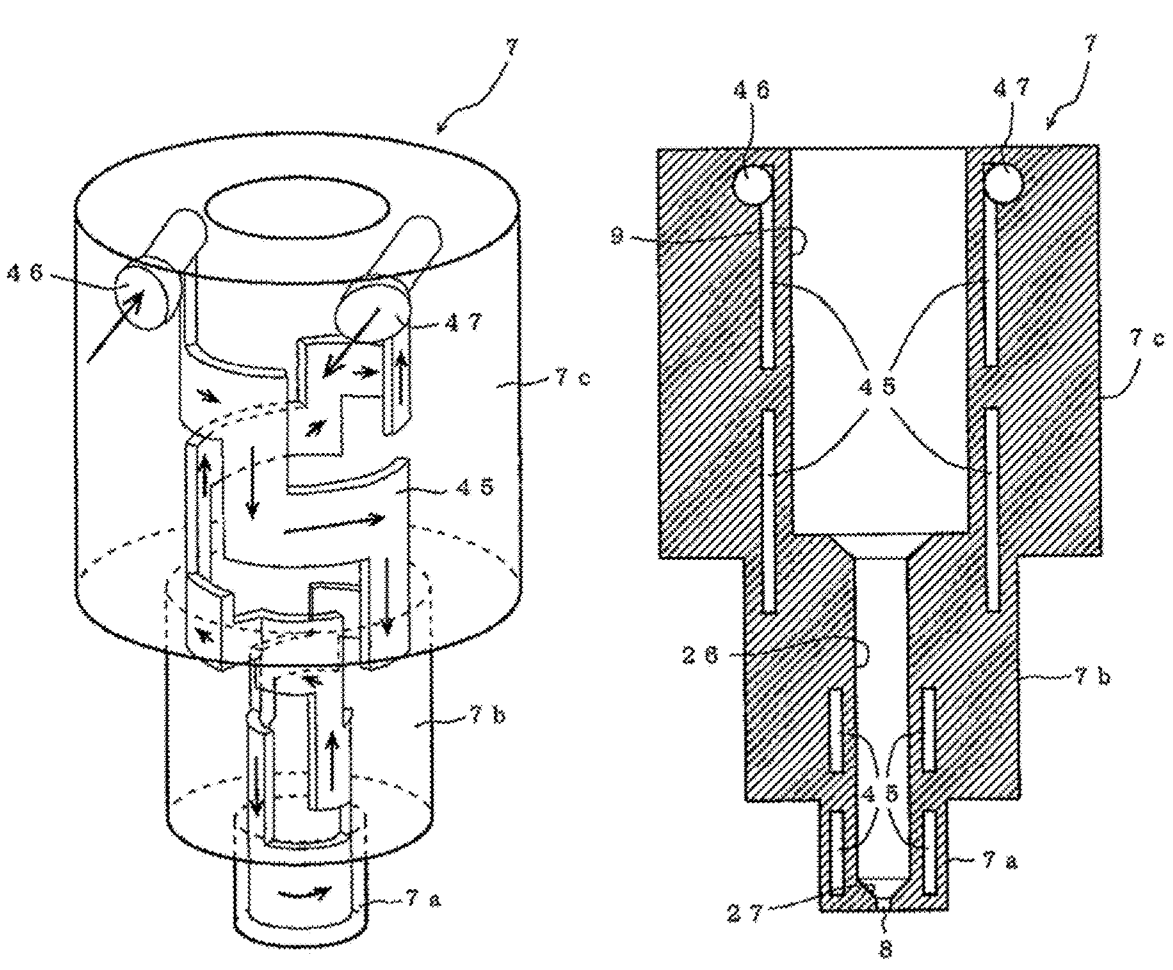
FIGS. 6A and 6B are explanation drawings showing a coolant passage.

As shown in FIG. 6A, a coolant passage 45 is formed inside the injection device body 7 so that the coolant passage 45 surrounds the passage of the liquid coating agent 6 (one-component thermosetting coating composition) which flows through the measuring cylinder 9 and the passage hole 26 and is discharged from the injection port 8. The coolant passage 45 is formed in a double spiral shape surrounding the measuring cylinder 9 and the passage hole 26. Cooling water introduced from an inlet 46 formed on the left side of the upper part of the injection device body 7 is lowered in a counterclockwise direction when viewed from the above, elevated in a clockwise direction while changing the direction at the lower part of the injection device body 7, and discharged from an outlet 47 formed at the right side of the upper part of the injection device body 7. The injection device body 7 provided with the coolant passage 45 having the above described complicated shape is manufactured by a metal 3D (three-dimensional) printer, a lost wax casting, or the like. Since the cooling water flowing the coolant passage 45 is provided, the liquid coating agent 6 (one-component thermosetting coating composition) stored in the measuring cylinder 9 and the passage hole 26 is prevented from being excessively heated by the heat of the upper mold 4. Thus, the progress of the curing reaction can be suppressed.

(Start of Measurement)

When introducing a predetermined amount of the coating composition 6 to the in-mold coat injection device 1 shown in FIG. 1, first, the fluid is supplied to the first passage 38 as shown in FIG. 2. As a result, the gate valve 14 is moved downward to the valve closing position and the piston 10 is moved upward. Consequently, the inside of the measuring cylinder 9 becomes a negative pressure and the coating composition 6 is introduced into the measuring cylinder 9 via the supply valve 13 (check valve). Here, if the tip valve portion 14*d* of the gate valve 14 is separated from the valve sheet 27, the coating composition 6 is leaked from the injection port 8. Thus, a leakage prevention spring 48 is provided on a ceiling surface of the cylinder block 37 for energizing the gate valve 14 downward and pressing the tip valve portion 14*d* against the valve sheet 27. Therefore, even if the actuator 15 becomes uncontrollable due to malfunction, emergency stop or the like of the actuator 15, the coating composition 6 in the device is not leaked into the molds. Note that the fluid located above the piston actuating flange 32 in the piston actuating cylinder 33 is discharged from the second passage 39 when the piston actuating flange 32 is moved upward.

(Completion of Measurement)

As shown in FIG. 3, the piston actuating flange 32 of the piston 10 abuts on the ceiling surface of the piston actuating cylinder 33. Thus, the piston 10 reaches the top dead center and a predetermined amount of the coating composition 6 is stored in the measuring cylinder 9. As described above, the measurement is completed.

(Start of Injection)

Then, the fluid is supplied to the second passage 39 as shown in FIG. 4 for injecting a predetermined amount of the coating composition 6 into the runner groove 20 from the injection port 8. As a result, the gate valve 14 is moved upward to open the injection port 8 while the piston 10 is moved downward to reduce the volume of the measuring cylinder 9. Consequently, the coating composition 6 in the measuring cylinder 9 is injected into the runner groove 20 from the injection port 8. At that time, since the supply valve 13 (check valve) is provided, the coating composition 6 in the measuring cylinder 9 is prevented from flowing reversely toward the tank 28 (shown in FIG. 1). Note that the fluid located below the piston actuating flange 32 in the piston actuating cylinder 33 is discharged from the first passage 38 when the piston actuating flange 32 is moved downward, while fluid above the gate valve actuating flange 34 in the gate valve actuating cylinder 35 is discharged from the first passage 38 when the gate valve actuating flange 34 is moved upward.

(Completion of Injection)

As shown in FIG. 5, the lower surface of a stroke adjustment ring 49 provided on the piston 10 abuts on the upper surface of the injection device body 7. Thus, the piston 10 reaches the bottom dead center and the injection of the coating composition 6 is completed. A stroke S (shown in FIG. 3) from the top dead center to the bottom dead center can be adjusted by appropriately changing a thickness t of the stroke adjustment ring 49. Thus, the injection amount of the coating composition 6 can be adjusted. On the other hand, the gate valve 14 abuts on the bottom surface of a stopper bolt 51 screwed into a screw hole 50 which penetrates through the ceiling surface of the cylinder block 37. Thus, the valve opening position is determined. The interval between the tip valve portion 14*d* of the gate valve 14 and the valve sheet 27 at the valve opening position can be adjusted by appropriately changing the screwing position of the stopper bolt 51. Thus, a discharge rate (discharge amount per unit time) of the coating composition 6 discharged from the injection port 8 can be adjusted.

(Operations and Effects)

In the in-mold coat injection device 1 of the present embodiment, the measuring cylinder 9 of the coating composition 6 shown in FIG. 2 to FIG. 3 is also used as the extrusion cylinder of the coating composition 6 shown in FIG. 4 to FIG. 5. Thus, the piping connecting the measuring cylinder 9 and the extrusion cylinder can be omitted. When the coating composition 6 is introduced to the measuring cylinder 9, the injection port 8 is closed by the gate valve 14. Thus, the accuracy of the measurement of the coating composition 6 is increased.

In addition, as shown in FIG. 1, the coating composition 6 introduced from the supply port 11 to the measuring cylinder 9 via the supply passage 12 is extruded from the injection port 8 by the piston 10. The circulating passage and the circulation pump of the coating composition described in the prior art are not used. Thus, it is not necessary to discharge and dispose the coating composition remained in the circulating passage and the circulation pump after the daily operations. Thus, the manufacturing yield of the coating composition 6 is increased.

In addition, since the circulating passage and the circulation pump of the coating composition are not used, the entire the device can be made compact and the manufacturing yield of the coating composition 6 is increased. As described above, in the in-mold coat injection device 1 of the present embodiment, the accuracy of the amount of injecting the coating composition 6 is high, the manufacturing yield of the coating composition 6 is good, and the device can be made compact.

The preferable embodiments of the present invention are explained above with reference to the drawings. Of course, the present invention is not limited to the above described embodiments. It goes without saying that various variation examples and modified examples within the range described in the claims are included in the technical scope of the present invention.

INDUSTRIAL APPLICABILITY

The present invention can be used for the in-mold coat injection device configured to hold a molding base material on one mold, press the other mold against the one mold to cover the molding base material and inject a predetermined amount of liquid coating agent into a coating gap formed between an inner surface of the other mold and a surface of the molding base material.

DESCRIPTION OF THE REFERENCE NUMERALS

1: in-mold coat injection device, 2: molding base material, 3: one mold (lower mold), 4 the other mold (upper mold), 5: coating gap, 6: liquid coating agent (coating composition), 7: injection device body, 8: injection port, 9: measuring cylinder, 10: piston, 11: supply port, 12: supply passage, 13: supply valve (check valve), 14: gate valve, 15: actuator, 32: piston actuating flange, 33: piston actuating cylinder, 34: gate valve actuating flange, 35: gate valve actuating cylinder, 40: fluid pressure switching unit, 45: coolant passage

The invention claimed is:

1. An in-mold coat injection device configured to hold a molding base material mold a first mold, press a second mold against the first mold to cover the molding base material and inject a predetermined amount of liquid coating agent into a coating gap formed between an inner surface of the second mold and a surface of the molding base material, the in-mold coat injection device comprising:

an injection device body attached to the second mold;

an injection port provided on an end portion of the injection device body for injecting the liquid coating agent into the coating gap;

a measuring cylinder provided inside the injection device body and connected to the injection port;

a piston configured to be moved inside the measuring cylinder in an axial direction of the measuring cylinder;

a supply port provided at a side portion of the injection device body and connected to the measuring cylinder;

a supply valve provided on a supply passage of the liquid coating agent connected to the supply port to close the supply passage when the piston moves to a discharge direction for reducing a volume of the measuring cylinder and open the supply passage when the piston moves to a suction direction for increasing the volume of the measuring cylinder;

a gate valve slidably attached to the piston in an axial direction of the piston so that the gate valve is slid and moved between a valve opening position for opening the injection port and a valve closing position for closing the injection port; and an actuator configured to fill a predetermined amount of the liquid coating agent into the measuring cylinder by moving the gate valve to the valve closing position and moving the piston to the suction direction for introducing the liquid coating agent from the supply port to the measuring cylinder, and then discharge the predetermined amount of the liquid coating agent from the injection port by moving the gate valve to the valve opening position and moving the piston to the discharge direction.

2. The in-mold coat injection device according to claim 1, wherein the supply valve is a check valve for allowing the liquid coating agent to flow from the supply passage to the measuring cylinder and preventing the liquid coating agent from flowing from the measuring cylinder to the supply passage.

3. The in-mold coat injection device according to claim 2, wherein the actuator includes:

a piston actuating flange formed on a portion of the piston protruded from the measuring cylinder for moving the piston in the axial direction of the measuring cylinder;

a piston actuating cylinder formed to house the piston actuating flange in the piston actuating cylinder so that the piston actuating flange can be freely moved along the axial direction of the measuring cylinder;

a gate valve actuating flange formed on a portion of the gate valve protruded from the piston for moving the gate valve in the axial direction of the piston;

a gate valve actuating cylinder connected to the piston actuating cylinder for housing the gate valve actuating flange in the gate valve actuating cylinder so that the gate valve actuating flange is freely movable along the axial direction of the piston; and a fluid pressure switching unit for switching between a measurement mode where a fluid pressure is applied on an upper surface of the gate valve actuating flange and a lower surface of the piston actuating flange to close the injection port by the gate valve and move the piston to the suction direction and an injection mode where the fluid pressure is applied on a lower surface of the gate valve actuating flange and an upper surface of the piston actuating flange to open the injection port by the gate valve and move the piston to the discharge direction.

4. The in-mold coat injection device according to claim 3, wherein the liquid coating agent is a one-component thermosetting coating composition, and a coolant passage is formed inside the injection device body for surrounding a passage of the liquid coating agent discharged from the measuring cylinder to the injection port.

5. The in-mold coat injection device according to claim 1, wherein the actuator includes:

a piston actuating flange formed on a portion of the piston protruded from the measuring cylinder for moving the piston in the axial direction of the measuring cylinder;

a piston actuating cylinder formed to house the piston actuating flange in the piston actuating cylinder so that the piston actuating flange can be freely moved along the axial direction of the measuring cylinder;

a gate valve actuating flange formed on a portion of the gate valve protruded from the piston for moving the gate valve in the axial direction of the piston;

a gate valve actuating cylinder connected to the piston actuating cylinder for housing the gate valve actuating flange in the gate valve actuating cylinder so that the gate valve actuating flange is freely movable along the axial direction of the piston; and a fluid pressure switching unit for switching between a measurement mode where a fluid pressure is applied on an upper surface of the gate valve actuating flange and a lower surface of the piston actuating flange to close the injection port by the gate valve and move the piston to the suction direction and an injection mode where the fluid pressure is applied on a lower surface of the gate valve actuating flange and an upper surface of the piston actuating flange to open the injection port by the gate valve and move the piston to the discharge direction.

6. The in-mold coat injection device according to claim 5, wherein the liquid coating agent is a one-component thermosetting coating composition, and a coolant passage is formed inside the injection device body for surrounding a passage of the liquid coating agent discharged from the measuring cylinder to the injection port.

* * * * *